United States Patent [19]

Purviance

[11] 4,123,195

[45] Oct. 31, 1978

[54] CHUCK KEY HOLDER

[76] Inventor: John R. Purviance, 29530 Highmeadow Rd., Farmington Hills, Mich. 48024

[21] Appl. No.: 840,682

[22] Filed: Oct. 11, 1977

[51] Int. Cl.[2] .............................................. B23B 39/00

[52] U.S. Cl. ................................ 408/241 R; 81/90 A; 279/1 K

[58] Field of Search ........................... 408/241 R, 910; 279/1 K; 81/90 A

[56] References Cited

U.S. PATENT DOCUMENTS

| | | | |
|---|---|---|---|
| 2,609,719 | 9/1952 | Lilley | 81/90 A |
| 3,457,813 | 7/1969 | Mangas | 81/90 A |

*Primary Examiner*—Travis S. McGehee
*Attorney, Agent, or Firm*—Reising, Ethington, Barnard, Perry & Brooks

[57] ABSTRACT

A chuck key holder in which a manual force is applied to handles of clamp members on one side of a drill chuck to position a chuck key that is rotatably mounted on a support to which the clamp members are pivoted in properly located spanning engagement with the chuck on its other side. Spring biasing of the clamp members from the closed clamping position about the chuck toward an open position moves ejecting portions of the clamp members against the chuck to automatically withdraw the chuck key once the manual force is released from the handles. Clamping portions of the clamp members are located between the handles and the axes of pivotal connection between the support and the clamp members. Partially circular clamping surfaces of the clamping portions have first ends adjacent the ejecting portions and second ends adjacent stops on the clamp members for limiting the extent of closing movement without the chuck between the clamp members. Each clamp member is preferbly molded from plastic with a unitary construction identical to the other clamp member and includes an integral spring portion that engages the support to provide the spring bias toward the open position. The support includes a pair of identical support members which are each molded from plastic with a unitary construction having a U shape. Securement of the support members to each other in an opposed relationship locates projections thereof in a spaced relationship at opposite ends of the support to receive and pivotally mount the respective clamp members therebetween for movement between the open and closed positions. Semicircular openings of the support members face each other to define a round opening that receives and rotatably mounts the chuck key.

8 Claims, 4 Drawing Figures

CHUCK KEY HOLDER

BACKGROUND OF THE INVENTION

1. Field of the Invention

This invention relates to a chuck key holder for positioning a chuck key in spanning engagement with a drill chuck and for automatically rejecting the chuck key upon manual release of the holder.

2. Description of the Prior Art

Automatic ejection of a chuck key from spanning engagement with a drill chuck is desirable in order to prevent inadvertent rotational operation with the key still engaged with the chuck. This ejection prevents injuries that may occur by swinging of the chuck key about the chuck during its rotation.

One conventional way of ejecting chuck keys is to spring load the nose of the key which is inserted into the drill chuck hole so that manual release of the key causes the spring loading to move the nose outwardly in a resilient manner that provides the ejection of the key. However, this spring loading must be overcome by force applied to the chuck key when it is inserted into the chuck in spanning engagement for tightening or loosening a drill within the chuck. Difficulty in maintaining the meshing engagement between the key and chuck teeth can take place while concomitantly attempting to overcome the spring loading of the key nose, especially when the teeth become worn.

Holders for positioning the chuck while also providing automatic ejection thereof are disclosed by U.S. Pat. Nos. 3,174,365 and 3,728,038. These holders also automatically eject the key from the chuck upon manual release and guide the key into and out of spanning engagement with the chuck. However, the force which is applied to the chuck key during tightening and loosening of a drill must overcome the bias of the holder just like with the spring loaded nose type chuck key ejector. The same problem of maintaining the chuck in position against the spring bias is thus present with this type of holder.

U.S. Pat. No. 3,190,665 discloses a chuck key holder which does not have automatic ejection but which nevertheless positions the chuck key for movement into and of spanning engagement with the drill chuck. This is accomplished by a partially circular portion of the holder which is moved axially over the chuck and a U-shaped portion connected to the partially circular portion and having a hole in which the chuck is slidably mounted for movement toward and away from the chuck.

British Patent specification 847,385 discloses a nut spanner in which a pair of members are pivoted to each other in a scissor-like manner so that rotational operation of a nut tightener mechanism can provide tightening of a specially designed toothed nut captured between cooperable first ends of the members. Movement of second end of the members toward and away from each other provides for the release or postioning of the nut for operation of the tightening mechanism.

SUMMARY OF THE INVENTION

An object of the present invention is to provide an improved chuck key holder wherein a manual effort applied to the holder by one hand on one side of the chuck securely positions the chuck key on the other side of the chuck in properly located spanning engagement therewith to permit the other hand to rotate the key freely and operate the chuck without tooth skipping and wherein release of the holder by the one hand provides automatic ejection of the chuck key.

In carrying out the above object, the chuck key holder includes a support having an opening for receiving and rotatably mounting the chuck key and a pair of clamp members mounted on the support for pivotal movement between open and closed positions about respective axes on opposite sides of the opening. Clamping portions of the clamp members are located between handles thereof and the associated pivotal connections to the support. Movement of the key into spanning engagement with the chuck moves the handles toward each other to a closed position to capture the drill chuck between the clamping portions and position the chuck key in properly located spanning engagement with the chuck. Ejecting portions of the clamp membrs are located on the opposite sides of the clamping portions from the handles and provide the closing movement. The clamp members are spring biased such that the ejecting portions press against the chuck upon manual release of the handles so as to also move the clamp members to the open position and the chuck key out of the spanning engagement with the chuck to provide ejection.

In the preferred embodiment, the clamping portion of each clamp member includes a partially circular clamping surface that engages the chuck in the closed position. Each partially circular clamping surface has first and second ends respectively adjacent its ejecting portion and handle. Stops are located at the second ends of the clamping surfaces and engage each other to limit the extent of closing clamp member movement without the chuck therebetween.

Each clamp member is molded from plastic with a unitary construction identical to the other and includes a spring portion that engages the support to provide the biasing of the clamp member toward the open position. The support includes a pair of identical plastic molded support members secured to each other. Each support member has a U shape with opposite ends from which projections extend such that securement of the support members in an opposed relationship locates the projections in spaced pairs to receive and pivotally mount the clamp members therebetween. Semicircular openings of the support members face each other to define a round opening that receives and rotatably mounts the chuck key.

The chuck key holder of this invention is particularly adaptable for use with portable electric drills as it forms a handle in the best location for holding the drill steady while the chuck is being opened or closed and drill bits added or removed, especially those of the larger industrial type which are much more difficult to handle due to their greater weight as well as to their greater size. The holder can be manufactured and sold with or without a chuck key rotatably mounted on its support. Making the support with the pair of support members permit the purchaser to secure the support members to each other with suitable fasteners after first locating the chuck key between the supports to be received within the round opening formed by the semicircular openings upon completion of the securement.

The objects, features, and advantages of the present invention are readily apparent from the following detailed description of the preferred embodiment taken in connection with the accompanying drawings.

DETAILED DESCRIPTION OF THE PREFERRED EMBODIMENT

Figure 1:
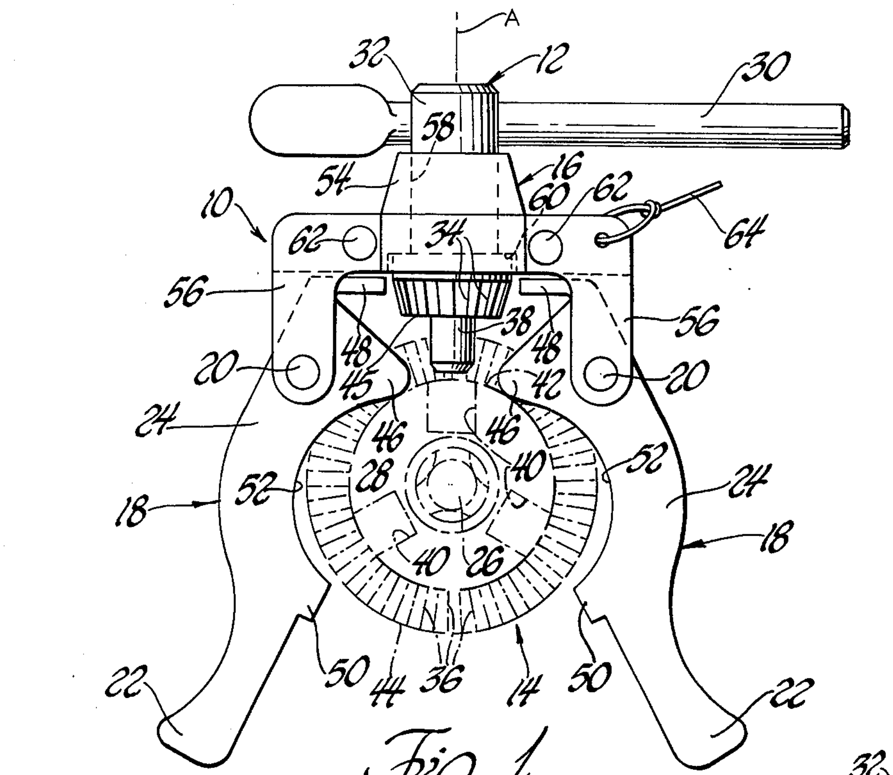
FIG. 1 is a front view of a chuck key holder embodying the present invention shown with clamp members of the holder located in an open position with respect to a drill chuck shown by phantom line representation.

With reference to FIG. 1, a chuck key holder indicated generally by 10 i constructed according to the present invention and used to securely position a chuck key 12 on the other side of the chuck in properly located spanning engagement with a drill chuck 14. Key holder 10 includes a support 16 and a pair of clamp members 18 which are pivoted to the support by pins 20 for movement about spaced axes. Briefly, as the key 12 is moved into spanning engagement with the chuck 14 by the operator with one hand, clamp members 18 and handles 22 thereof on one side of the drill chuck 14 move toward each other from the open position of FIG. 1 to the closed position of FIG. 2 where clamping portions 24 capture the chuck 14 and position the chuck key 12 in properly located spanning engagement with the chuck to tighten or loosen the drill 26 within the chuck jaws 28. Tightening and loosening of the chuck takes place as the key 12 is rotated by a handle 30 thereof so that a journal body 32 rotates about axis A and meshes the bevel gear teeth 34 of the key with the level gear teeth 36 of the chuck. During this rotation, key nose 38 is positioned within one of the holes 40 in the jaw cylinder 42 (FIG 3) by the clamping action of the handles so that that gear cylinder 44 can be rotated by meshing of the key and chuck teeth 34 and 36 to tighten or loosen the jaws 28 about the drill 26 without tooth skipping and without rubbing between the key face 45 and the jaw cylinder 42.

Figure 2:
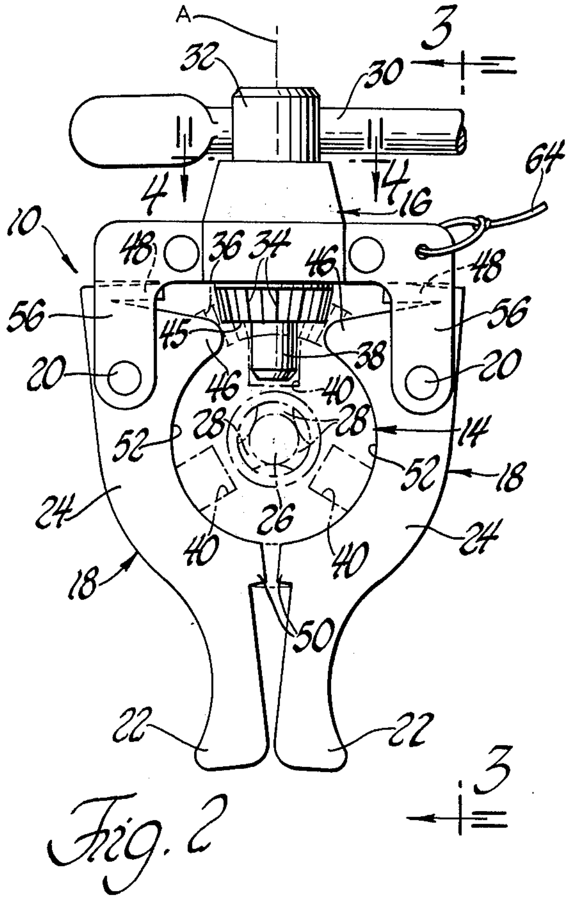
FIG. 2 is a view similar to FIG. 1 but with the clamp members moved to a closed position such that a chuck key mounted by a support to which the clamp members are pivoted is located in spanning engagement with the chuck.

Ejecting portions 46 of clamp members 18 actuate the closing clamp member movement as the key 12 is meshed with the chuck 14 and eject the key from the chuck when spring portions 48 of the clamp members provide movement thereof from the closed position of FIG. 2 to the open position of FIG. 1 as the handles are manually released. Movement of the clamp members 18 to the closed position of FIG. 2 against the bias of spring portions 48 without the chuck therebetween engages stops 50 adjacent the handles 22 to limit the extent of this closing movement and possible damage to the spring portions. Clamping portions 24 of each clamp member 18 includes a partially clamping surface 52 with a first end adjacent the ejecting portion 46 and a second end adjacent the handle 22 and the stop 50. Very little force is required on handles 22 to maintain the proper key positioning due to the orientation of surfaces 52 adjacent stops 50 with respect to the location of key 12 on the other side of the chuck. Clamp members 18 are preferably molded from plastic with a unitary construction, each being identical to the other. Spring portions 48 are thus integral with the rest of the clamp members so that the plastic material thereof provides the hinge for each spring portion and the bias thereof to the FIG. 1 position. During the molding, the spring portions are therefor oriented with respect to the clamp members as shown in FIG. 1.

Figure 4:
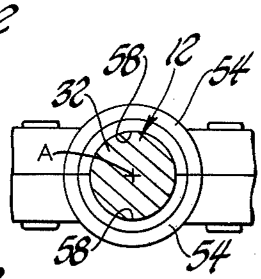
FIG. 4 is a sectional view taken along line 4—4 of FIG. 2 through the chuck key showing a pair of support members of the support that rotatably mounts the key.
Figure 3:
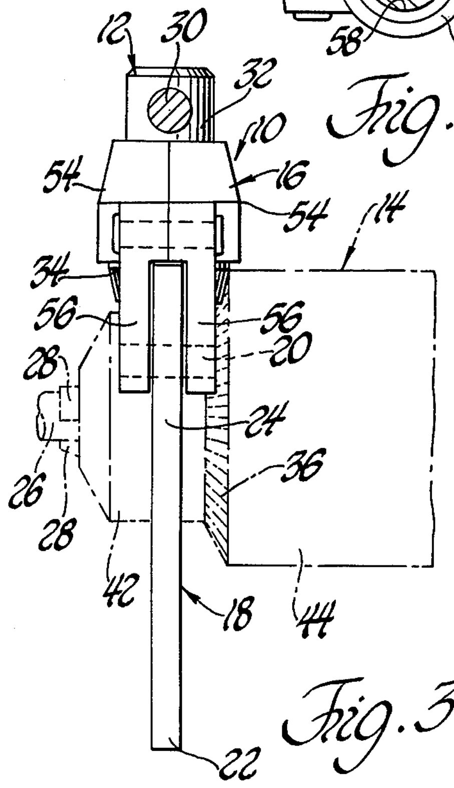
FIG. 3 is a side view of the holder taken along line 3—3 of FIG. 2.

Key support 16 includes a pair of support members 54 that are molded from plastic with an identical construction to each other, preferably with the U shape shown. Opposite ends of each support member 54 include projections 56 that are spaced from the projections of the adjacent support member as seen in FIG. 3 to receive the clamp member 18 therebetween for pivoting to the support by the associated pin 20. Spring portions 48 engage the support 16 at the interengaged surfaces thereof toward the key teeth 34 from the projections 56. A journal portion of each support member 54 includes a semicircular opening 58 (FIG. 4) that opposes the opening of the other support member to define a round opening which rotatably supports the key body 32. As seen in FIG. 1, support members 54 cooperatively define a lower recess 60 of a slightly larger size than the openings 58 so as to receive the bevel gear portion of the key and to limit outward movement of the key while the handle 30 limits inward movement with respect to the support so that the key is properly located. Rivets 62 or other suitable fasteners secure the support members to each other. As opposed to using rivets, a hole and a post may also be provided at the same locations as the rivets. Insertion of the post of each support member through the hole of the other and suitable securement by snap fasteners or the like retains the support members to each other with the key 12 rotatably mounted. A cord 64 tied through a suitable hole in the support 16 allows the holder to be secured to the drill with which it is used.

As is evident from the foregoing description, each chuck holder 10 must be sized to the particular chuck 14 with which it is used. The location of the pivotal axes of pins 20 with respect to the chuck key teeth 34 is important so that the ejecting portions 46 may move to the closed position shown in FIG. 2 while also being movable to the open position of FIG. 1 for ejection of the chuck key in order to prevent inadvertent rotation of the chuck with the key 12 still in spanning engagement with it. Also, the lower ends of the projections 56 on the support, see FIG. 3, must be spaced from the gear cylinder teeth 36 so that there is no engagement therebetween during the rotation of the key.

While a preferred embodiment of the chuck key holder has herein been described in detail, those familar with this art will recognize various alternative designs and embodiments for practicing the present invention as defined by the following claims.

What is claimed is:

1. A chuck key holder comprising: a support having an opening for receiving and rotatably mounting a chuck key; a pair of clamp members mounted on the support for pivotal movement between open an closed positions about respective axes on opposite sides of the opening; each clamp member having a handle and a chuck clamping portion located between the handle thereof and the associated pivotal axes of movement on the support; said chuck clamping portion being cooperable in the closed position to position a drill chuck therebetween so as to securely position the chuck key for rotation in properly located spanning engagement with the chuck; each clamp member also having an ejecting portion located on the opposite side of the clamping portion thereof as the handle thereof; and means biasing the clamp members to the open position such that the ejecting portions thereof move the support away from the chuck and the chuck key out of spanning engagement therewith as the clamp members move from the closed position to the open position.

2. A holder as in claim 1 wherein the clamping portion of each clamp member includes a partially circular clamping surface that engages the chuck in the closed position, and each partially circular clamping surface having first and second ends respectively adjacent the ejecting portion and the handle of the associated clamp member.

3. A holder as in claim 2 further including a pair of stops respectively mounted on the pair of clamp members adjacent the second ends of the clamping surfaces as well as adjacent the handles thereof.

4. A holder as in claim 1 wherein each clamp member is molded from plastic with a unitary construction and includes a spring portion that engages the support to provide the means for biasing the clamp member to the open position.

5. A holder as in claim 1 wherein the support includes opposite ends each of which includes a pair of spaced projections between which one of the clamp members is pivotally mounted.

6. A holder as in claim 1 wherein the support includes a pair of identical plastic molded members secured to each other, each support member having opposite ends with projections extending therefrom to define a U shape of the support member, the projections at adjacent ends of the support members being spaced from each other to receive and pivotally mount one of the clamp members therebetween, and each clamp member being molded from plastic with a unitary construction identical to the other clamp member and including a spring portion that engages the support to provide the means for biasing the clamp member to the open position.

7. A chuck key holder comprising: a support having a central opening for receiving and rotatably mounting a chuck key and also having opposite ends including respective pairs of spaced projections; a pair of unitary plastic molded clamp members pivotally mounted between the spaced projections at opposite ends of the support for movement between open and closed positions; each clamp member having a handle and a chuck clamping portion located between the handle thereof and the associated pivotal axis of movement on the support; each clamping portion having a partially circular clamping surface that engages a drill chuck in the closed position such that the clamp members position the chuck in properly located spanning engagement with the chuck; an ejecting portion on each clamp member located on the opposite side of the clamping portion as the handle; and integral spring portions on the clamp members engaged with the support to bias the clamp members to the open position such that the ejecting portions move the support away from the chuck and the chuck key out of spanning engagement therewith as the clamp members move from the closed position to the open position.

8. A holder as in claim 7 wherein the support includes a pair of identical molded plastic unitary members each of which has a U shape, and each support member having a semicircular opening opposing the semicircular opening of the other support member to define a round opening that receives the chuck key, and each clamp member having a shape identical to the other clamp member.

* * * * *

UNITED STATES PATENT AND TRADEMARK OFFICE

CERTIFICATE OF CORRECTION

PATENT NO. : 4,123,195

DATED : October 31, 1978

INVENTOR(S) : John R. Purviance

It is certified that error appears in the above-identified patent and that said Letters Patent are hereby corrected as shown below:

Column 1, line 44, after "and" insert --out--.

Column 2, line 17, "membrs" should be --members--.

Column 3, line 21 "i" should be --is--.

Column 3, line 40, "level" should be --bevel--.

Column 4, line 8, after "are" insert --also--.

Column 4, line 58 "an" should be --and--.

Signed and Sealed this

*Third* Day of *April 1979*

[SEAL]

*Attest:*

RUTH C. MASON
*Attesting Officer*

DONALD W. BANNER
*Commissioner of Patents and Trademarks*